(12) United States Patent
Jung et al.

(10) Patent No.: US 12,063,077 B2
(45) Date of Patent: Aug. 13, 2024

(54) LEARNING DEVICE

(71) Applicant: LG ELECTRONICS INC., Seoul (KR)

(72) Inventors: Sungbo Jung, Seoul (KR); Hagryang Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 498 days.

(21) Appl. No.: 17/423,340

(22) PCT Filed: Jan. 15, 2019

(86) PCT No.: PCT/KR2019/000606
§ 371 (c)(1),
(2) Date: Jul. 15, 2021

(87) PCT Pub. No.: WO2020/149428
PCT Pub. Date: Jul. 23, 2020

(65) Prior Publication Data
US 2022/0103267 A1 Mar. 31, 2022

(51) Int. Cl.
*H04W 4/00* (2018.01)
*H04B 17/19* (2015.01)
(Continued)

(52) U.S. Cl.
CPC ............. *H04B 17/19* (2015.01); *H04B 17/21* (2015.01); *H04B 17/318* (2015.01); *H04W 24/06* (2013.01); *G06N 3/0455* (2023.01)

(58) Field of Classification Search
None
See application file for complete search history.

(56) References Cited

U.S. PATENT DOCUMENTS

| 10,171,150 B1* | 1/2019 | Marupaduga .......... H04B 7/043 |
| 10,171,282 B1* | 1/2019 | Marupaduga .......... H04L 27/38 |

(Continued)

FOREIGN PATENT DOCUMENTS

| KR | 10-2014-0036565 A | 3/2014 |
| KR | 10-2015-0084177 A | 7/2015 |

(Continued)

OTHER PUBLICATIONS

International Search Report for PCT/KR2019/000606 mailed on Oct. 14, 2019.

(Continued)

*Primary Examiner* — Bob A Phunkulh
(74) *Attorney, Agent, or Firm* — Birch, Stewart, Kolasch & Birch, LLP

(57) ABSTRACT

According to an embodiment of the present disclosure, a learning device may include a communication unit, database configured to store wireless environment data sets representing wireless environments between an image transmission device and an image reception device, and a processor configured to generate a plurality of wireless environment space types respectively mapped to the wireless environment data sets, generate a beamforming learning model by learning a correlation between antenna configuration factors and communication quality factors for each of the wireless environment space types, determine a wireless environment space type corresponding to the new wireless environment data set from among the plurality of wireless environment space types when a new wireless environment data set is received, and determine values of the antenna configuration factors using a beamforming learning model corresponding to the determined wireless environment space type.

6 Claims, 7 Drawing Sheets

(51) Int. Cl.
  *H04B 17/21* (2015.01)
  *H04B 17/318* (2015.01)
  *H04W 24/06* (2009.01)
  *G06N 3/0455* (2023.01)

(56) References Cited

U.S. PATENT DOCUMENTS

| | | | |
|---|---|---|---|
| 10,564,251 B1* | 2/2020 | Baxley | G01S 5/0273 |
| 2010/0214169 A1 | 8/2010 | Kafle | |
| 2016/0294451 A1 | 10/2016 | Jung et al. | |
| 2017/0352954 A1 | 12/2017 | Abdallah et al. | |
| 2018/0067558 A1* | 3/2018 | Eagleman | G09B 21/04 |
| 2018/0177461 A1* | 6/2018 | Bell | A61B 8/5207 |
| 2018/0253954 A1* | 9/2018 | Verma | G08B 25/08 |
| 2018/0352519 A1* | 12/2018 | Navarro | H04W 52/50 |
| 2019/0082256 A1* | 3/2019 | Robbins | G06V 20/62 |
| 2019/0387421 A1 | 12/2019 | Cho et al. | |
| 2020/0142022 A1* | 5/2020 | Baxley | G01S 5/0054 |
| 2020/0153902 A1* | 5/2020 | Higuchi | H04L 67/1097 |
| 2021/0089812 A1* | 3/2021 | Li | G06N 3/08 |
| 2021/0384953 A1* | 12/2021 | Shental | H04B 7/0434 |
| 2022/0060264 A1* | 2/2022 | Zhang | H04B 17/17 |

FOREIGN PATENT DOCUMENTS

| | | |
|---|---|---|
| KR | 10-2016-0118070 A | 10/2016 |
| WO | WO 2017/213883 A1 | 12/2017 |
| WO | WO 2018/159944 A1 | 9/2018 |

OTHER PUBLICATIONS

Alkhateeb et al., "Deep learning coordinated beamforming for highly-mobile millimeter wave systems," IEEE Access, vol. 6, 2018, pp. 37328-37348.

\* cited by examiner

| SPACE TYPE | DISTANCE (m) | HORIZONTAL ANGLE (DEGREES) | VERTICAL ANGLE (DEGREES) |
|---|---|---|---|
| 1 | 3.11 | 21 | 5 |
| 2 | 3.12 | 19.5 | 3.3 |
| 3 | 3.10 | 20.5 | 3.4 |
| 4 | 3.09 | 20.2 | 3.7 |

LEARNING DEVICE

CROSS REFERENCE TO RELATED APPLICATIONS

This application is the National Phase of PCT International Application No. PCT/KR2019/000606, filed on Jan. 15, 2019, all of which is hereby expressly incorporated by reference into the present application.

TECHNICAL FIELD

The present disclosure relates to a learning device.

BACKGROUND ART

As image technology changes from analog to digital, development has been made from SD (Standard-Definition) to HD (Hi-Definition) to provide images closer to a real scene. SD supports a resolution of 704×480 and consists of about 350,000 pixels. HD is classified into HD and Full HD. Among them, Full HD supports a resolution of 1920×1080 and consists of 2 million pixels to provide a significantly higher quality image compared to SD.

Recent image technology is growing one step further to Ultra High-Definition (MD) beyond Full HD. The UHD, which supports high image quality and ultra-high resolution, is spotlighted as a next-generation media environment. The UHD supports 4K (3840×2160) and 8K (7680×4320) resolutions and up to 22.2 channel surround audio. Compared to the HD, the UHD provides 4 times clearer picture quality even in 4K UHD standards, and the 8K UHD provides 16 times clearer picture quality than the HD.

Meanwhile, a stable wireless environment is required to wirelessly transmit the UHD AV (Audio-Video) signal to an external output device in real time.

DISCLOSURE

Technical Problem

An object of the present disclosure is to adjust antenna arrangement using artificial intelligence such that radio quality is optimized even under changing wireless environment conditions.

An object of the present disclosure is to optimize radio quality by using a learning model for a wireless environment.

Technical Solution

According to an embodiment of the present disclosure, a learning device may include a communication unit, database configured to store wireless environment data sets representing wireless environments between an image transmission device and an image reception device, and a processor configured to generate a plurality of wireless environment space types respectively mapped to the wireless environment data sets, generate a beamforming learning model by learning a correlation between antenna configuration factors and communication quality factors for each of the wireless environment space types, determine a wireless environment space type corresponding to the new wireless environment data set from among the plurality of wireless environment space types when a new wireless environment data set is received, and determine values of the antenna configuration factors using a beamforming learning model corresponding to the determined wireless environment space type.

According to an embodiment of the present disclosure, a recording medium storing a program for executing a method for beamforming control, may include generating a plurality of wireless environment space types mapped to the wireless environment data sets, generating a beamforming learning model by learning a correlation between antenna configuration factors and communication quality factors for each of the wireless environment space types, when a new wireless environment data set is received, determining a wireless environment space type corresponding to the new wireless environment data set from among the plurality of wireless environment space types, and determining values of the antenna configuration factors using a beamforming learning model corresponding to the determined wireless environment space type.

Advantageous Effects

According to an embodiment of the present disclosure, it is possible to optimize radio quality using artificial intelligence to seamlessly transmit images even under a condition in which the wireless environment changes.

The present disclosure uses a learning model for a wireless environment, so that the antenna arrangement is automatically adjusted to optimize the radio quality, so that the user experience can be greatly improved.

DESCRIPTION OF DRAWINGS

FIG. 5 is a ladder diagram for describing a method of operating a beamforming control system according to an embodiment of the present disclosure.

MODE FOR INVENTION

Hereinafter, embodiments of the inventive concept will be described in detail with reference to the exemplary drawings. The suffixes "module" and "unit or portion" for components used in the following description are merely provided only for facilitation of preparing this specification, and thus they are not granted a specific meaning or function.

An image transmission device according to an embodiment of the present disclosure is, for example, an intelligent device in which a computer support function is added to a broadcast reception function, and which performs not only a broadcast reception function but also an Internet function, and is equipped with a more user-friendly interface such as a handwriting input device, a touch screen, or a spatial remote control. In addition, the image transmission device is connected to the Internet and a computer with the support of a wired or wireless Internet function to perform functions such as e-mail, web browsing, banking, games, or the like. A standardized general-purpose OS may be used for these various functions.

Accordingly, in the image transmission device described in the present disclosure, various user-friendly functions can be performed because various applications can be freely added or deleted, for example, on a general-purpose OS kernel.

Figure 1:
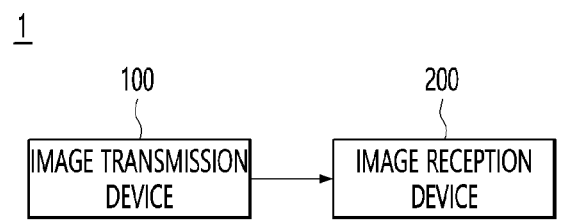
FIGS. 1 to 3 are diagrams for describing a configuration of a display system according to an embodiment of the present disclosure.
Figure 2:
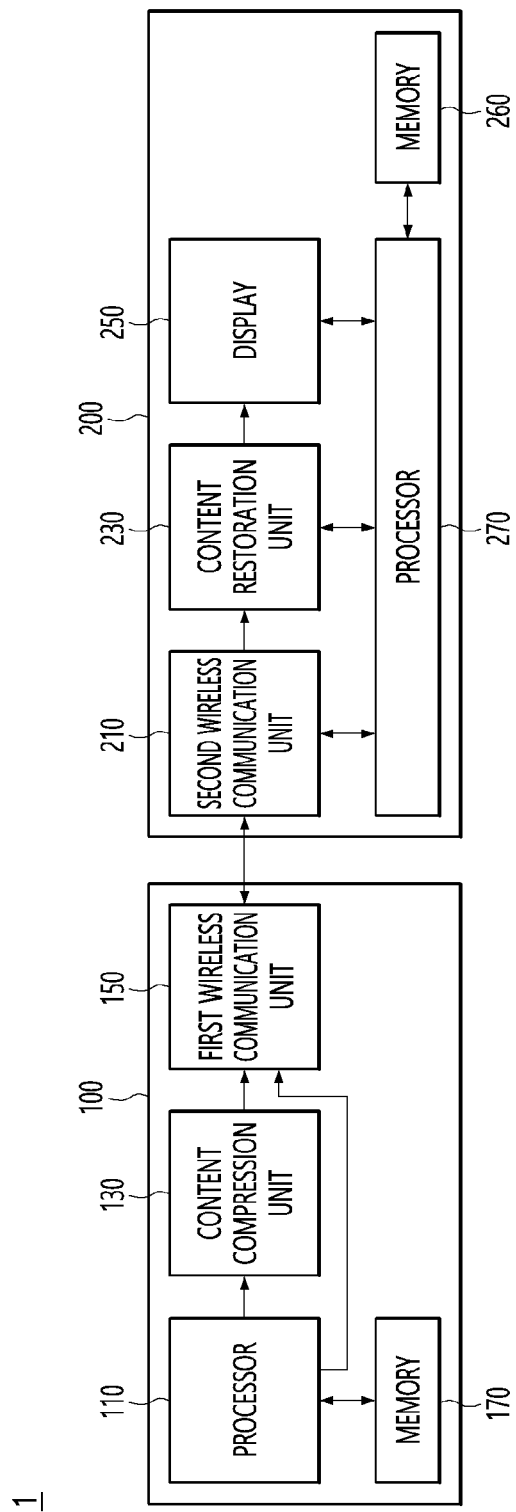
Figure 3:
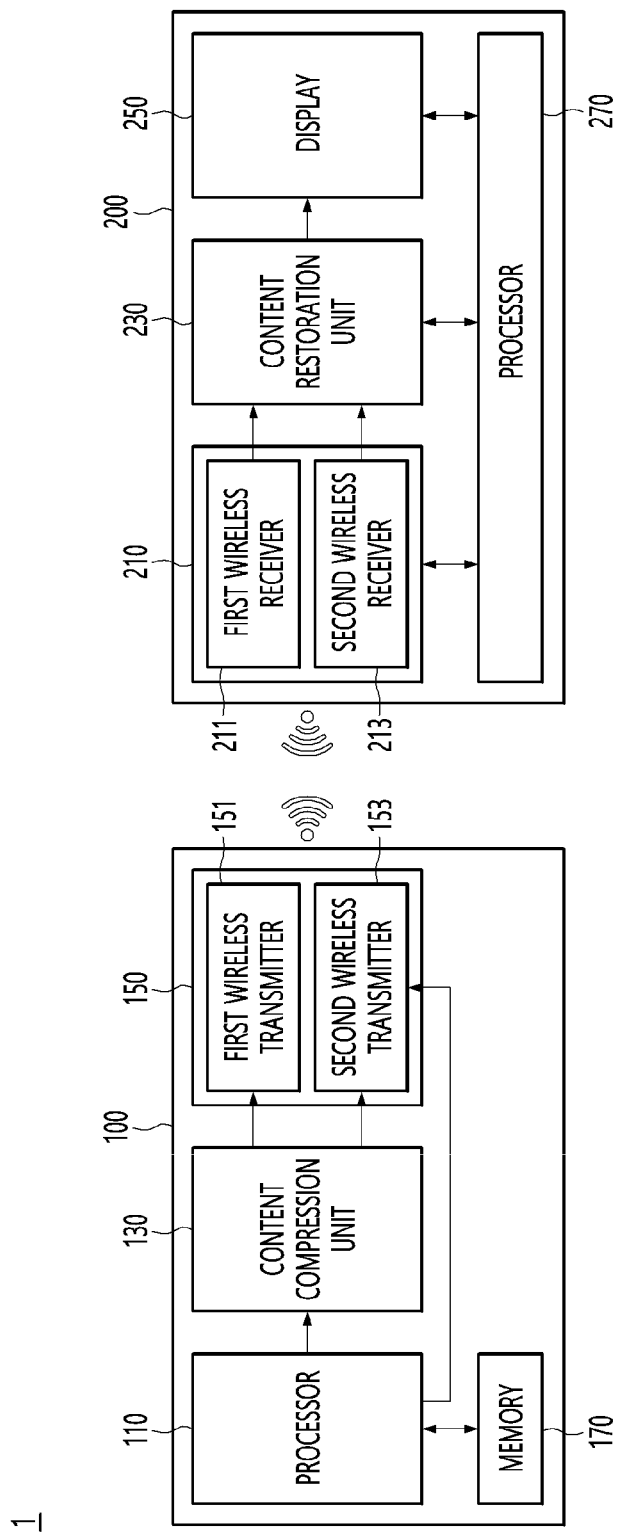

FIGS. 1 to 3 are diagrams for describing a configuration of a display system according to an embodiment of the present disclosure.

Referring to FIG. 1, a display system 1 according to an embodiment of the present disclosure may include an image transmission device 100 and an image reception device 200.

The image transmission device 100 may be a device capable of encoding a content image and wirelessly transmitting the encoded content image.

The image reception device 200 may be a display device capable of wirelessly receiving encoded content and decoding the received content.

The image transmission device 100 and the image reception device 200 may constitute a video wall display system.

In a video wall, a display having a thin bezel plays an important role in the visualization of content images. For a thin bezel of a display, it is efficient that components capable of minimal functions are only provided and a circuit or a component for a main function is provided in a separate device.

The image transmission device 100 may determine a type of the content image input from the outside, and determine a compression rate of the content image based on the determined type. The compression rate of the content image may refer to a compression rate of the data size of the content image.

The type of the content image may include a still image type, a general video type, and a game video type.

The image transmission device 100 may compress the content image according to the determined compression rate, and wirelessly transmit the compressed content image to the image reception device 200.

The image reception device 200 may restore the compressed content image received from the image transmission device 100 and display the restored content image on the display.

FIG. 2 is a block diagram illustrating detailed configurations of the image transmission device 100 and the image reception device 200.

Referring to FIG. 2, the image transmission device 100 may include a processor 110, a content compression unit 130, a first wireless communication unit 150, and a memory 170.

The processor 110 may control overall operation of the image transmission device 100. The processor 110 may be configured in the form of a system on chip (SoC).

A plurality of processors 110 may be provided.

The processor 110 may determine a compression rate of the audio or video, which is inputted from the outside, according to the type of a content image, and transmit one or more of the audio or video to the content compression unit 130 according to the determined compression rate.

The content compression unit 130 may change the compression rate of the content image according to a radio quality to compensate for the loss of the content image or the disconnection of wireless connection. The content image may include one or more of audio and video.

When the radio quality is poor, the content compression unit 130 may lower a data transmission rate (increase the compression rate).

The content compression unit 130 may increase the data transmission rate (the compression rate is low) when the radio quality is good.

The content compression unit 130 may be referred to as an encoder.

The first wireless communication unit 150 may wirelessly transmit the content image compressed by the content compression unit 130 to the image reception device 200.

The memory 170 may store one or more signal patterns used to synchronize an AV signal and a control signal matching the AV signal.

Referring to FIG. 3, the first wireless communication unit 150 may include a first wireless transmitter 151 and a second wireless transmitter 153.

The first wireless communication unit 150 may transmit the compressed content image to a second wireless communication unit 210 of the image reception device 200 through 2 channels.

That is, each of the first wireless transmitter 151 and the second wireless transmitter 153 may transmit the compressed content image to a first wireless receiver 211 and a second wireless receiver 213 of the image reception device 200, individually.

In an embodiment, the reason for using 2 channels is to reduce transmission delay by transmitting a compressed content image through a channel having a better radio quality.

In another embodiment, the reason for using 2 channels may be to divide and transmit the content image through 2 channels because a content image having a 4K resolution has a large data capacity.

Each of the first wireless transmitter 151 and the second wireless transmitter 153 may include a baseband module for baseband communication and an RF module for RF communication.

The baseband module may generate unmodulated low frequency band data for the compressed content image and transmit the data to the RF module.

The RF module may convert the low frequency band data into high frequency band data according to a radio frequency (RF) communication standard, and transmit the converted data for the content image to the image reception device 200.

The image reception device 200 may include a second wireless communication unit 210, a content restoration unit 230, and a display 250.

The second wireless communication unit 210 may include a first wireless receiver 211 and a second wireless receiver 213.

That is, the second wireless communication unit 210 may also be configured with two channels.

Each of the first wireless receiver 211 and the second wireless receiver 213 may include a baseband module for baseband communication and an RF module for RF communication.

The RF module may receive the high frequency band data from the image transmission device 100 according to a radio frequency (RF) communication standard.

The baseband module may convert the high frequency band data into low frequency band data.

The content restoration unit 230 may decode the content image received through the second wireless communication unit 210.

The content restoration unit 230 may restore the compressed content image to a content image having an original size.

The content restoration unit 230 may include a decoder.

The display 250 may display the restored content image.

The image reception device 200 may further include a memory 260. The image reception device 200 may store information received from the image transmission device 100 and a program for executing an application.

Figure 4:
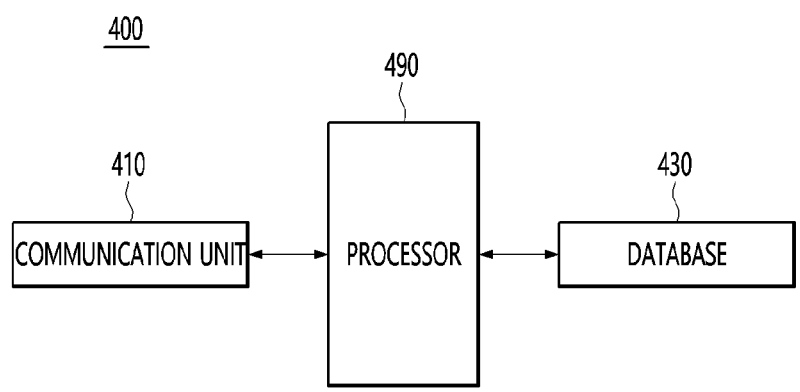
FIG. 4 is a diagram for describing a configuration of a learning server according to an embodiment of the present disclosure.

FIG. 4 is a diagram for describing a configuration of a learning server according to an embodiment of the present disclosure.

Referring to FIG. 4, a learning server 400 may include a communication unit 410, a database 430, and a processor 490

The communication unit 410 may receive wireless environment data sets from the image transmission device 100 or the image reception device 200 through the Internet.

The database 430 may store the wireless environment data sets.

The processor 490 may generate a plurality of wireless environment space types by using the collected wireless environment data sets.

The processor 490 may generate a beamforming learning model by learning a correlation between antenna configuration factors and communication quality factors for each wireless environment space type.

The processor 490 may receive a new wireless environment data set from the image transmission device 100.

The processor 490 may determine a wireless environment space type corresponding to the received new wireless environment data set.

The processor 490 may determine values of antenna configuration factors by using a beamforming learning model corresponding to the determined wireless environment space type.

The processor 490 may transmit the determined values of the antenna configuration factors to the image transmission device 100 through the communication unit 410.

Figure 5:
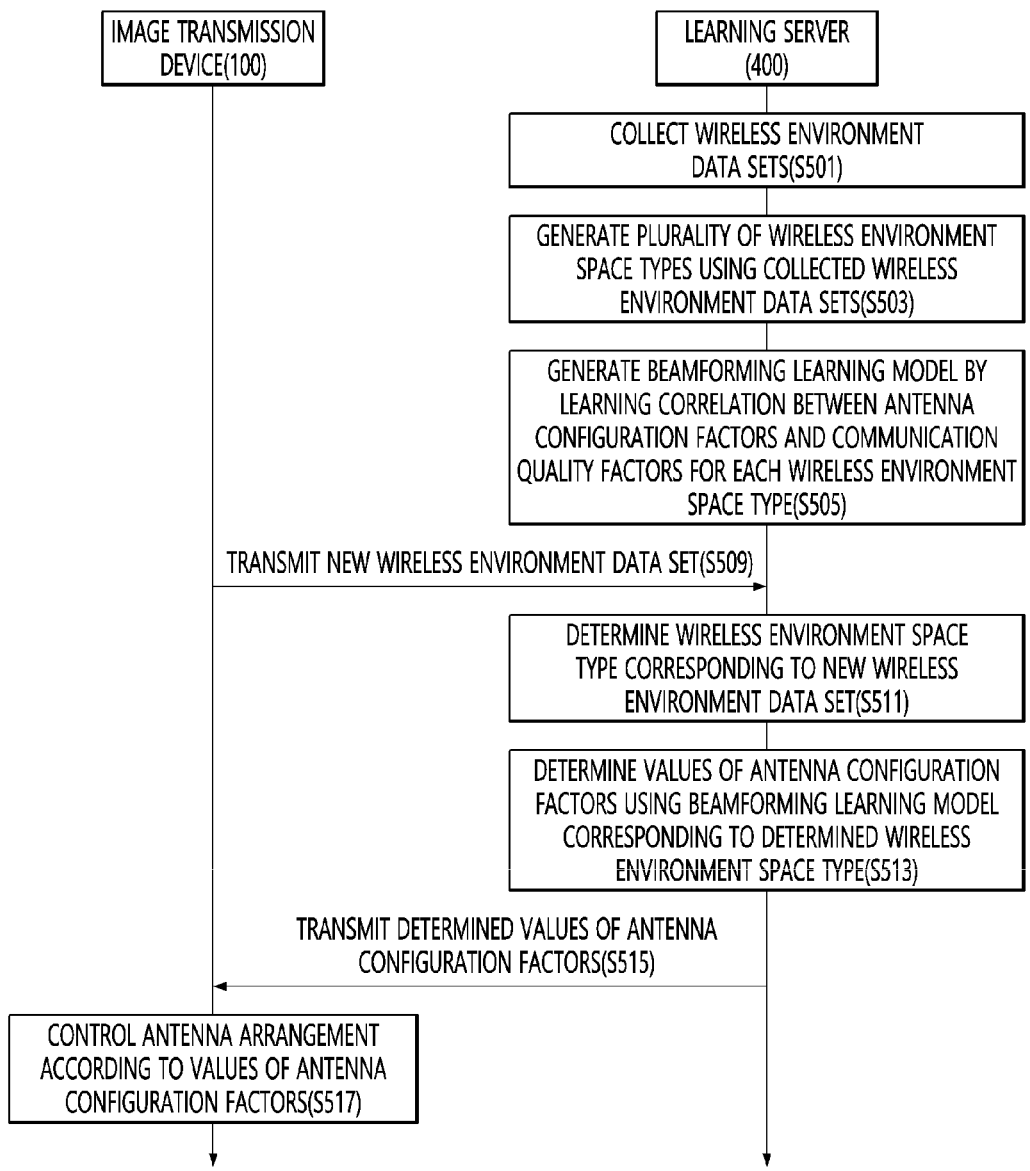
FIG. 5 is a diagram illustrating a process of transmitting AV signal patterns and control signal patterns according to an embodiment of the present disclosure to an image reception device.

FIG. 5 is a ladder diagram for describing a method of operating a beamforming control system according to an embodiment of the present disclosure.

Referring to FIG. 5, the processor 490 of the learning server 400 collects wireless environment data sets (S501).

In an embodiment, the wireless environment data set may include one or more of weather, temperature, and humidity of a place where the image transmission device 100 is disposed, a type of an obstacle positioned between the image transmission device 100 and a size of a space where the image transmission device 100 is disposed.

The processor 490 may receive a plurality of wireless environment data sets from the wireless system 1 or another wireless system through the communication unit 410.

In an embodiment, information on temperature and humidity may be collected through a temperature sensor and a humidity sensor which are attached to the image transmission device 100 or the image reception device 200, an air purifier, or an air conditioner and transmitted to the learning server 400 through the Internet.

In an embodiment, information on weather may be received from an external server by the image transmission device 100 or the image reception device 200 and transmitted to the learning server 400 through the Internet.

In another embodiment, the image transmission device 100 or the image reception device 200 may receive information on weather, temperature, and humidity from an air purifier or air conditioner disposed in the same space, and transmit the received information to the learning server 400 through the Internet.

The information on weather, temperature, and humidity may be periodically collected and updated in the learning server 400.

The processor 490 of the learning server 400 may generate a plurality of wireless environment space types by using the collected wireless environment data sets (S503).

In an embodiment, the processor 490 may generate a plurality of wireless environment space types using unsupervised learning.

Unsupervised learning may be a learning method for discovering patterns in training data itself and classifying a data set into one space type.

The processor 490 may use any one of a generative adversarial network (GAN) and an autoencoder (AE) neural network for unsupervised learning. Autoencoder).

The Genetic Adversarial Network (GAN) is a machine learning method in which two different artificial intelligences, a generator and a discriminator, compete with each other and improve performance.

In this case, the generator is a model for creating new data, and may generate new data based on original data.

In addition, the discriminator is a model for recognizing a pattern of data, and may discriminate the authenticity of the new data generated by the generator based on the original data.

The generator may receive and learn data that did not deceive the discriminator, and the discriminator may receive and learn the deceived data from the generator. Accordingly, the generator may evolve to deceive the discriminator as best as possible, and may evolve to distinguish original data of the discriminator from the data generated by the generator.

The autoencoder is a neural network that aims to reproduce the input itself as an output.

The autoencoder includes an input layer, a hidden layer and an output layer, and the input data passes through the input layer and enters the hidden layer.

In this case, since the number of nodes in the hidden layer is less than the number of nodes in the input layer, the dimension of the data is reduced, and thus compression or encoding is performed.

Also, data output from the hidden layer enters the output layer. In this case, since the number of nodes in the output layer is greater than the number of nodes in the hidden layer, the dimension of the data is increased, and thus decompression or decoding is performed.

Meanwhile, the autoencoder may control the neuron's connection strength through learning, so that the input data is expressed as hidden layer data. In the hidden layer, information is represented by the smaller number of neurons than that in the input layer, and reproducing the input data as an output may mean that the hidden layer has found and expressed a hidden pattern from the input data.

Figure 6:
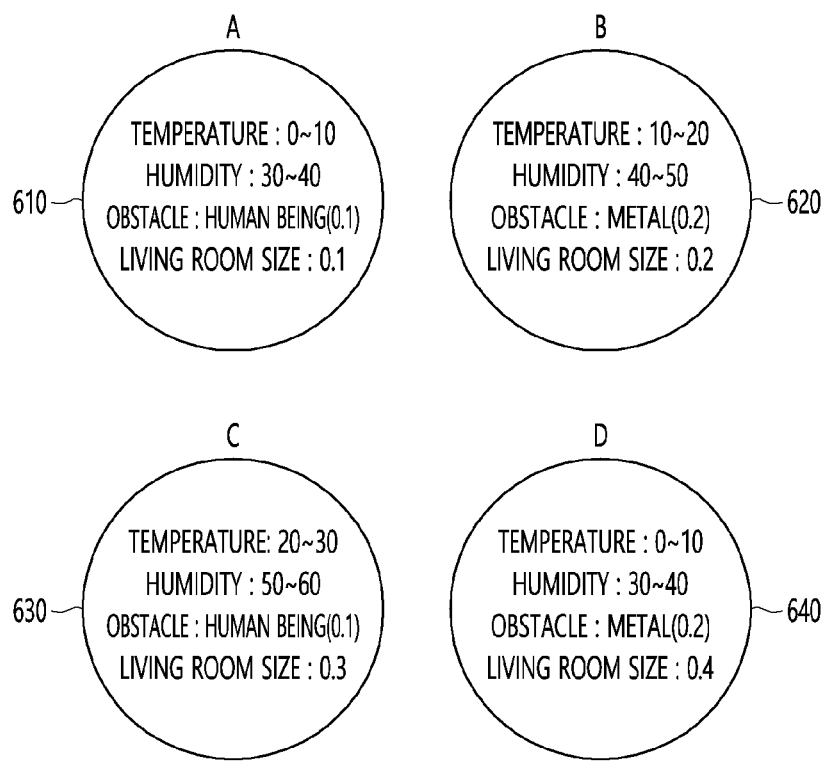
FIG. 6 is a diagram for describing an example in which a plurality of wireless environment space types are generated using unsupervised learning according to an embodiment of the present disclosure.

FIG. 6 is a diagram for describing an example in which a plurality of wireless environment space types are generated using unsupervised learning according to an embodiment of the present disclosure.

Referring to FIG. 6, a result of clustering the wireless environment space types through unsupervised learning for wireless environment data sets is shown.

The processor 490 may generate a space type model for mapping the wireless environment data sets to any one wireless environment space type using unsupervised learning.

The processor 490 may map the wireless environment data set to any one wireless environment space type by using the space type model.

A first wireless environment space type 610 may be a space type in which a temperature is in the range of 0 to 10 degrees, a humidity is in the range of 30 to 40 percent, the type of obstacle is human being (encoded value is 0.1), and the size of a living room where the image transmission device 100 is disposed is 0.1 (encoded value).

A second wireless environment space type 620 may be a space type in which a temperature is in the range of 10 to 20 degrees, a humidity is in the range of 40 to 50 percent, the type of obstacle is metal (encoded value is 0.2), and the size of a living room where the image transmission device 100 is disposed is 0.2 (encoded value).

A third wireless environment space type 630 may be a space type in which a temperature is in the range of 20 to 30 degrees, a humidity is in the range of 50 to 60 percent, the type of obstacle is human being (encoded value is 0.1), and the size of a living room where the image transmission device 100 is disposed is 0.3 (encoded value).

A fourth wireless environment space type 630 may be a space type in which a temperature is in the range of 0 to 10 degrees, a humidity is in the range of 30 to 40 percent, the type of obstacle is metal (encoded value is 0.2), and the size of a living room where the image transmission device 100 is disposed is 0.4 (encoded value).

The wireless environment space types shown in FIG. 6 are only examples, and more wireless environment space types may exist.

Meanwhile, the wireless environment space type may be newly created as information on weather, temperature, and humidity is updated.

That is, the learning server 400 may retrain the space type model according to the updated information.

Description will be given referring again to FIG. 5.

The processor 490 of the learning server 400 may generate a beamforming learning model by learning the correlation between antenna configuration factors and communication quality factors for each wireless environment space type (S505).

In an embodiment, the processor 490 may learn a correlation between the antenna configuration factors and the communication quality factors for each of a plurality of wireless environment space types and generate a beamforming learning model for determining weights respectively corresponding to the antenna configuration factors.

That is, the beamforming learning model may be a model for determining the weights of the antenna configuration factors to obtain the optimized values of the communication quality factors in one wireless environment space type.

The number of beamforming learning models may correspond to the number of wireless environment space types. That is, one beamforming learning model may correspond to one wireless environment space type.

The antenna configuration factors may include a distance (inter-antenna distance) between an antenna included in the first wireless communication unit 150 of the image transmission device 100 and an antenna included in the second wireless communication unit 210 of the image reception device 200, and a horizontal angle and a vertical angle of an antenna included in the first wireless communication unit 150.

The horizontal angle of the antenna may indicate an angle at which the antenna is rotated in a left or right direction with respect to a reference point.

The horizontal angle of the antenna may indicate an angle at which the antenna is rotated in an upward or downward direction with respect to a reference point.

The communication quality factors may include an error rate indicating an error rate of data, and a reception sensitivity of data.

The processor 490 may determine, using a deep learning algorithm, sets of weights that optimize the communication quality factors.

Specifically, the processor 490 may determine a set of weights for minimizing the error rate and maximizing the reception sensitivity.

Details will be described with reference to FIG. 7.

Figures 7, 8:
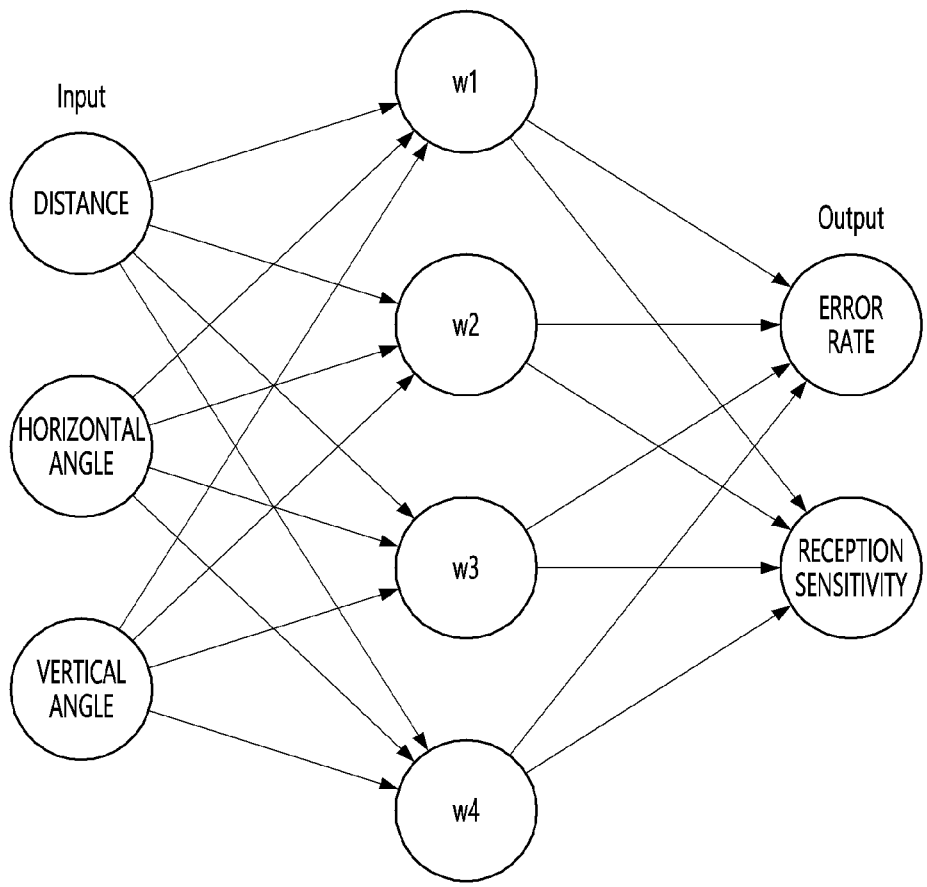
FIG. 7 is a diagram for describing a process of learning a correlation between antenna configuration factors and communication quality factors according to an embodiment of the present disclosure.
FIG. 8 is a diagram for describing examples of values of antenna configuration factors transmitted by a learning server to an image transmission device according to an embodiment of the present disclosure.

FIG. 7 is a diagram for describing a process of learning a correlation between antenna configuration factors and communication quality factors according to an embodiment of the present disclosure.

Referring to FIG. 7, the processor 490 may determine weights w1 to w4 to enable an optimal error rate and an optimal reception sensitivity by using a deep learning algorithm utilizing, as input data, the antenna configuration factors, such as the inter-antenna distance, the horizontal angle of the antenna, and the vertical angle of the antenna.

In this process, a loss function may be used to obtain the weights.

The loss function may be a function used to determine weights for maximizing a reception sensitivity while minimizing an error rate using antenna configuration factors as control variables.

Again, details will be described with reference to FIG. 6.

The processor 490 of the learning server 400 receives a new wireless environment data set from the image transmission device 100 (S509).

The received new wireless environment data set uses the learning result, the inter-antenna distance included in the image transmission device 100 and the antenna included in the image reception device 200, and the horizontal level of the antenna included in the image transmission device 100. It can be used to determine the angle and horizontal angle.

The image transmission device 100 determines the temperature and humidity of the location where the image transmission device 100 is located, the type of obstacle located between the image transmission device 100 and the image reception device 200, and the space in which the image transmission device 100 is located. A new wireless environment data set including the size of may be transmitted to the learning server 400.

The image transmission device 100 may include a temperature sensor, a humidity sensor, a camera for identifying a type of an obstacle through image recognition, and a distance sensor for identifying an inter-antenna distance.

In another example, the learning server 400 may receive the wireless environment data set from the user's mobile terminal rather than the image transmission device 100.

To this end, the mobile terminal may include a temperature sensor, a humidity sensor, a distance sensor, and a camera.

That is, the subject that collects the wireless environment data set may be the image transmission device 100 or the user's mobile terminal.

As another example, an entity that collects and transmits the wireless environment data to the learning server 400 may be the image reception device 200.

The processor 490 of the learning server 400 determines a wireless environment space type corresponding to the received new wireless environment data set (S511).

The processor 490 may determine a wireless environment space type mapped to the new wireless environment data set from among a plurality of wireless environment space types by using a space type model.

For example, the processor 490 may map any one of the plurality of wireless environment space types 410 to 440 illustrated in FIG. 6 to the wireless environment data set using the space type model.

The processor 490 of the learning server 400 determines values of antenna configuration factors by using a beamforming learning model corresponding to the determined wireless environment space type (S513).

The processor 490 may obtain weights of the beamforming learning model corresponding to the determined wireless environment space type.

Then, the processor 490 may determine values of the antenna configuration factors that allow the communication quality factors to have optimized values, using the obtained weights.

Specifically, the processor 490 may determine values of antenna configuration factors that satisfy a preset reference range of communication quality factors by using the obtained weights.

For example, the reference range may be set to a range in which the error rate is less than 1% and the reception sensitivity is greater than 100 dB.

The reference range may be a range set by default.

The processor 490 may determine values of antenna configuration factors such that the error rate is less than 1% and the reception sensitivity is greater than 100 dB.

As another example, a value of each of the optimized antenna configuration factors may be determined as a value within a specific range.

The processor 490 of the learning server 400 transmits the determined values of the antenna configuration factors to the image transmission device 100 through the communication unit 410 (S515).

The image transmission device 100 controls antenna arrangement according to the values of the antenna configuration factors (S517).

That is, the image transmission device 100 may adjust the antenna arrangement according to the values of the antenna configuration factors.

That is, the processor 110 of the image transmission device 100 may adjust the antenna arrangement so as to have the inter-antenna distance and the horizontal and vertical angles of the antenna which are received from the learning server 400. To this end, a motor (not shown) for adjusting the antenna arrangement of the may be further provided.

That is, the processor 110 of the image transmission device 100 may control its own antenna arrangement so as to have the inter-antenna distance and the horizontal and vertical angles of the antenna which are received from the learning server 400.

The image transmission device 100 may further include a sound output unit or a display unit and accordingly output a notification for requesting adjustment of the inter-antenna distance.

FIG. 8 is a diagram for describing examples of values of antenna configuration factors transmitted by a learning server to an image transmission device according to an embodiment of the present disclosure.

Referring to FIG. 8, values of antenna configuration factors that allow communication quality factors to have optimized values are shown for each of a plurality of wireless environment space types.

For example, for a first wireless environment space type, an inter-antenna distance for optimizing the communication quality between the image transmission device 100 and the image reception device 200 is 3.11 m, the horizontal angle of the antenna is 21 degrees, and the vertical Indicates that the angle is 5 degrees.

For a second wireless environment space type, it is shown that an inter-antenna distance for optimizing the communication quality between the image transmission device 100 and the image reception device 200 is 3.12 m, the horizontal angle of the antenna is 21 degrees, and the vertical angle is 5 degrees.

For a third wireless environment space type, it is shown that an inter-antenna distance for optimizing the communication quality between the image transmission device 100 and the image reception device 200 is 3.10 m, the horizontal angle of the antenna is 21 degrees, and the vertical angle is 5 degrees.

For the second wireless environment space type, it is shown that an inter-antenna distance for optimizing the communication quality between the image transmission device 100 and the image reception device 200 is 3.09 m, the horizontal angle of the antenna is 20.2 degrees, and the vertical angle is 3.7 degrees.

According to an embodiment of the present disclosure, antenna arrangement enabling an optimal wireless communication quality may be provided by automatically recognizing a wireless environment between the image transmission device 100 and the image reception device 200.

Accordingly, images transmitted by the image transmission device 100 to the image reception device 200 may be seamlessly transmitted without loss of image quality.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like.

The image transmission device described above may be configured in such a way that all or part of the embodiments are selectively combined such that various modifications can be made, rather than the configuration and method of the above-described embodiments are limitedly applied.

The invention claimed is:

1. A learning device, comprising:
   a communication unit;
   a database configured to store wireless environment data sets representing wireless environments between an image transmission device and an image reception device; and
   a processor configured to generate a plurality of wireless environment space types respectively mapped to the wireless environment data sets, generate a beamforming learning model by learning a correlation between antenna configuration factors and communication quality factors for each of the plurality of wireless environment space types, determine a wireless environment space type corresponding to a new wireless environment data set from among the plurality of wireless environment space types when the new wireless environment data set is received, and determine values of the antenna configuration factors using the beamforming learning model corresponding to the determined wireless environment space type, wherein the beamforming learning model is a model for determining weights of antenna configuration factors which enable the communication quality factors including an error rate and a reception sensitivity to be optimized, and wherein the processor is configured to determine the values of the antenna configuration factors such that the error rate is less than a reference range, and the reception sensitivity is greater than a reference range, using the beamforming learning model corresponding to the determined wireless environment space type.

2. The learning device of claim 1, wherein the antenna configuration factors include a distance between a first antenna included in the image transmission device and a second antenna included in the image reception device, a horizontal angle of the first antenna, and a vertical angle of the first antenna.

3. The learning device of claim 1, wherein the processor is configured to transmit the determined values of the antenna configuration factors to the image transmission device through the communication unit.

4. A non-transitory recording medium storing a program for executing a method for beamforming control, the method comprising:

generating a plurality of wireless environment space types mapped to the wireless environment data sets;

generating a beamforming learning model by learning a correlation between antenna configuration factors and communication quality factors for each of the plurality of wireless environment space types;

when a new wireless environment data set is received, determining a wireless environment space type corresponding to the new wireless environment data set from among the plurality of wireless environment space types; and determining values of the antenna configuration factors using the beamforming learning model corresponding to the determined wireless environment space type, wherein the beamforming learning model is a model for determining weights of antenna configuration factors which enable the communication quality factors including an error rate and a reception sensitivity to be optimized, and wherein the method further comprises determining the values of the antenna configuration factors such that the error rate is less than a reference range, and the reception sensitivity is greater than a reference range, using the beamforming learning model corresponding to the determined wireless environment space type.

5. The non-transitory recording medium of claim 4, wherein the antenna configuration factors include a distance between a first antenna included in the image transmission device and a second antenna included in the image reception device, a horizontal angle of the first antenna, and a vertical angle of the first antenna.

6. The non-transitory recording medium of claim 4, wherein the method further comprises transmitting the determined values of the antenna configuration factors to the image transmission device through a communication unit.

* * * * *